(12) United States Patent
McCombs

(10) Patent No.: US 6,621,181 B2
(45) Date of Patent: Sep. 16, 2003

(54) BATTERY STORAGE FOR GRID SCALE POWER WITHIN RIGHTS-OF-WAY

(76) Inventor: P. Roger McCombs, 1205 Country Ridge Dr., Richland, WA (US) 99352

( * ) Notice: Subject to any disclaimer, the term of this patent is extended or adjusted under 35 U.S.C. 154(b) by 146 days.

(21) Appl. No.: 09/947,090

(22) Filed: Aug. 31, 2001

(65) Prior Publication Data

US 2002/0027392 A1 Mar. 7, 2002

Related U.S. Application Data

(60) Provisional application No. 60/229,918, filed on Sep. 1, 2000.

(51) Int. Cl.$^7$ .................................................. H02J 7/00
(52) U.S. Cl. .......................................... 307/66; 320/107
(58) Field of Search ............................... 307/66, 64, 48; 320/107

(56) References Cited

U.S. PATENT DOCUMENTS 6,175,166 B1 * 1/2001 Bapat ........................... 307/64

* cited by examiner

*Primary Examiner*—Shawn Riley

(57) ABSTRACT

A plurality of electrical storage devices such as batteries capable of alternately storing and discharging electricity are connected to the power grid within existing rights of way. The electrical storage devices are batteries that may be alternately charged during periods of low power consumption and discharged during periods of high power consumption. In this manner, the power generating facilities can be operated at constant, or near constant generation, thereby optimizing the efficiency and productivity of the power generation. Significant amounts of power can then be stored within these batteries throughout the grid, thereby allowing the grid to meet peak loads by discharging the stored power during periods of high demand. Additionally, the placement of these batteries within existing rights of way allow the existing grid to be retrofitted to deliver more power without the need for costly and time consuming negotiations for new rights of way.

5 Claims, 10 Drawing Sheets

BATTERY STORAGE FOR GRID SCALE POWER WITHIN RIGHTS-OF-WAY

CROSS REFERENCE TO RELATED APPLICATIONS

This application claims priority to provisional Patent Application No. 60/229,918, filed Sep. 1, 2000, entitled BATTERY STORAGE FOR GRID SCALE POWER WITHIN RIGHTS-OF-WAY by Philip Roger McCombs, the entire contents of which are incorporated herein by this reference.

BACKGROUND OF THE INVENTION

Current shortages of electric power are causing concern and economic disruption within many industrialized countries. For example, within the past year, many parts of California have experienced power shortages where electrical utilities were compelled to turn off service to their customers in what have been termed "rolling blackouts" or "rolling brownouts." The cost of these disruptions in service can be significant. For example, it has been estimated that the cost of shutting down a semiconductor manufacturing facility due to inadequate electrical power can run into millions of dollars per hour.

Many factors have been blamed for the shortage of electrical power. One culprit is a shortage of deliverable power. i.e.; while generation capabilities exist to meet total demand, the supply is insufficient to meet demand at certain peak load hours such as the hottest part of the day during summer months or the coldest part of the day during winter months. Many experts and governmental officials propose constructing additional generation plants in order to meet these peak load needs. However, new generation plants are costly and require a long lead-time to obtain necessary permits. Further, environmental and other concerns often require new electrical power generation facilities to be located considerable distances from the urban areas where the power is ultimately consumed. This creates another problem exacerbating electrical power shortages; an insufficient transmission infrastructure.

Currently, much of the power generated in the United States is transported across electrical power lines placed property that is not owned by the owner of the electrical power lines. Transmission towers, power poles and the like instead utilize easements, or rights of way, to allow their placement on property. Building additional capacity to transport additional power thus often requires the construction of new infrastructure which traverses a patchwork of different property owners. Rights of way must often be separately negotiated with each individual owner, a process which is both time consuming and expensive.

Accordingly, there is a need for methods and devices that allow the expansion of the power carrying capacity of the existing electrical grid without the need to build expensive new infrastructure. There is a further need for methods and devices that allow electrical power transmission to more effectively balance the generating capabilities with electrical power demand.

SUMMARY OF THE INVENTION

Accordingly, it is an object of the present invention to provide a method for improving the performance of an electrical power distribution grid, wherein the grid utilizes existing rights of way to traverse real property. This objective is met by providing a plurality of electrical storage devices capable of alternately storing and discharging electricity located within existing rights of way, and connecting those storage devices to the grid. Preferably, while not meant to be limiting, the electrical storage devices are batteries that may be alternately charged during periods of low power consumption and discharged during periods of high power consumption. In this manner, the power generating facilities can be operated at constant, or near constant generation, thereby optimizing the efficiency and productivity of the power generation. Significant amounts of power can then be stored within these batteries throughout the grid, thereby allowing the grid to meet peak loads by discharging the stored power during periods of high demand. Additionally, the placement of these batteries within existing rights of way allow the existing grid to be retrofitted to deliver more power without the need for costly and time consuming negotiations for new rights of way. Rights-of-way as described in the present invention include, but are not limited to, those geographic areas designated through a permit granted by local or regional or national authority for use in certain industries for specified uses.

The types of right-of-way preferably utilized for the practice of the present invention for battery storage placement include, but are not limited to, gas line rights-of-way, power line rights-of-way, substation rights-of-way, petroleum rights-of-way, communications rights-of-way (such as fiber-optic or telephone), road rights-of-way, water rights-of-way, sewer rights-of-way, and railroad rights-of-way. The most rapid beneficial use of the present invention may be achieved by the use of existing rights of way. However, as new infrastructure is put in place, the benefits and advantages of the present invention may find further utility in utilizing new rights of way for the placement of batteries or other electrical storage devices. It is thus a further object of the present invention to locate at least some of the electrical storage devices within new rights of way that may be granted from time to time to expand the grid.

It is a further object of the present invention to utilize existing rights of way selected from the group consisting of gas line rights-of-way, power line rights-of-way, substation rights-of-way, petroleum rights-of-way, communications rights-of-way, road rights-of-way, water rights-of-way, sewer rights-of-way, railroad rights-of-way, and combinations thereof.

It is a further object of the present invention to place the electrical storage devices within the rights of way for electric transmission poles utilized in said grid.

It is a further object of the present invention to place the electrical storage devices within existing electrical transmission poles.

These and other objects of the present invention may be better understood and appreciated by reference to the following drawings and detailed description of the invention.

DETAILED DESCRIPTION OF THE INVENTION

Figure 1:
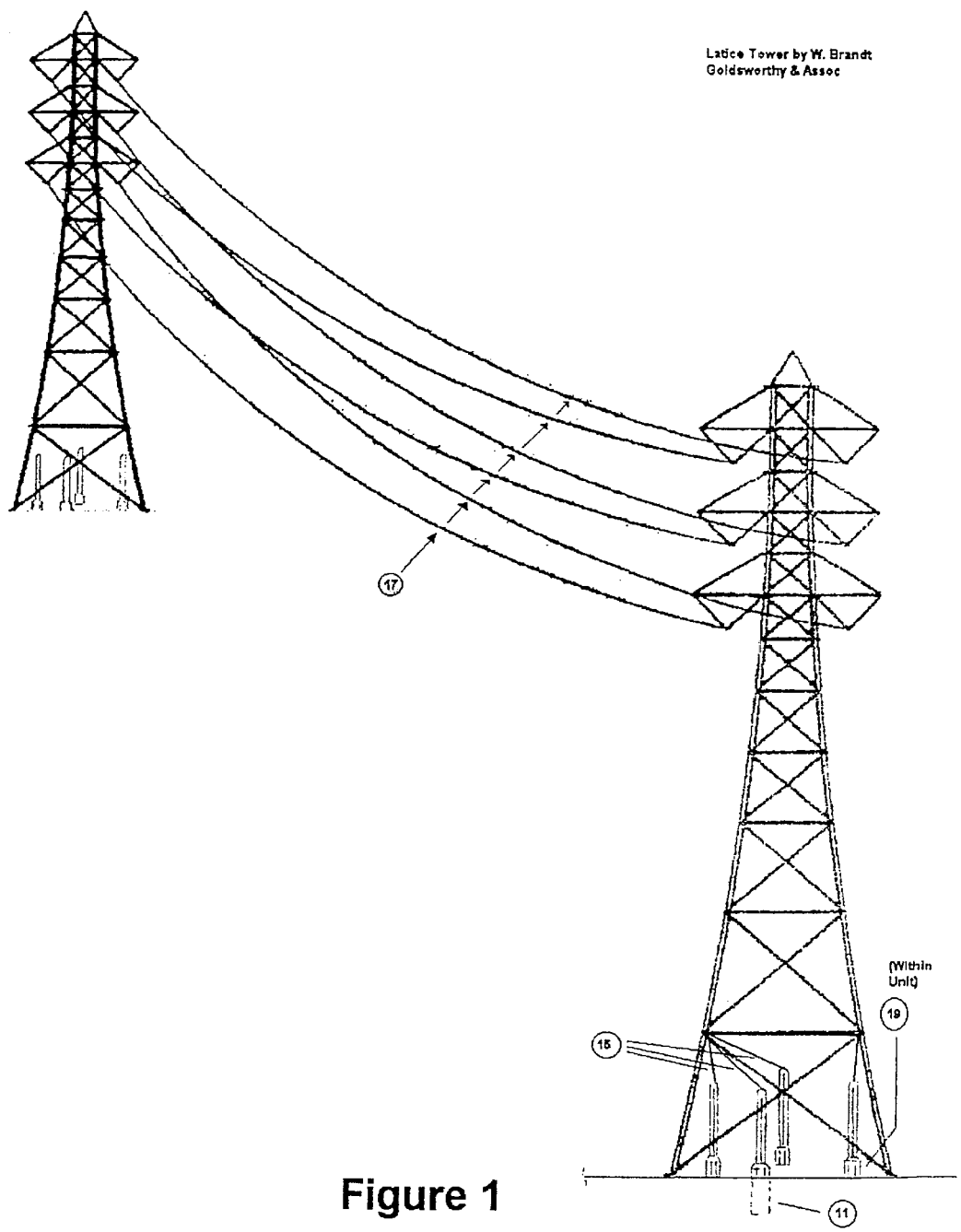
FIG. 1 is a schematic illustrating a standard lattice composite designed by W. Brandt Goldsworthy & Associates; manufactured by Strongwell Ebert, or alternatively steel towers within an existing electricity transmission right-of-way.

As shown in FIG. 1, batteries are placed underground in a location centrally placed at the base of a lattice tower. This placement allows the land between towers to continue to be used, for example, by farmers, who may plant crops or graze cattle or make other use of such land between towers. In FIG. 1, the batteries 11 are connected to the grid via conductor battery leads 15 tied to overhead conductors 17. The batteries 11 are controlled electronically by an electronic control mechanism 19, which causes the batteries to store electricity or discharge electricity.

Figure 2:
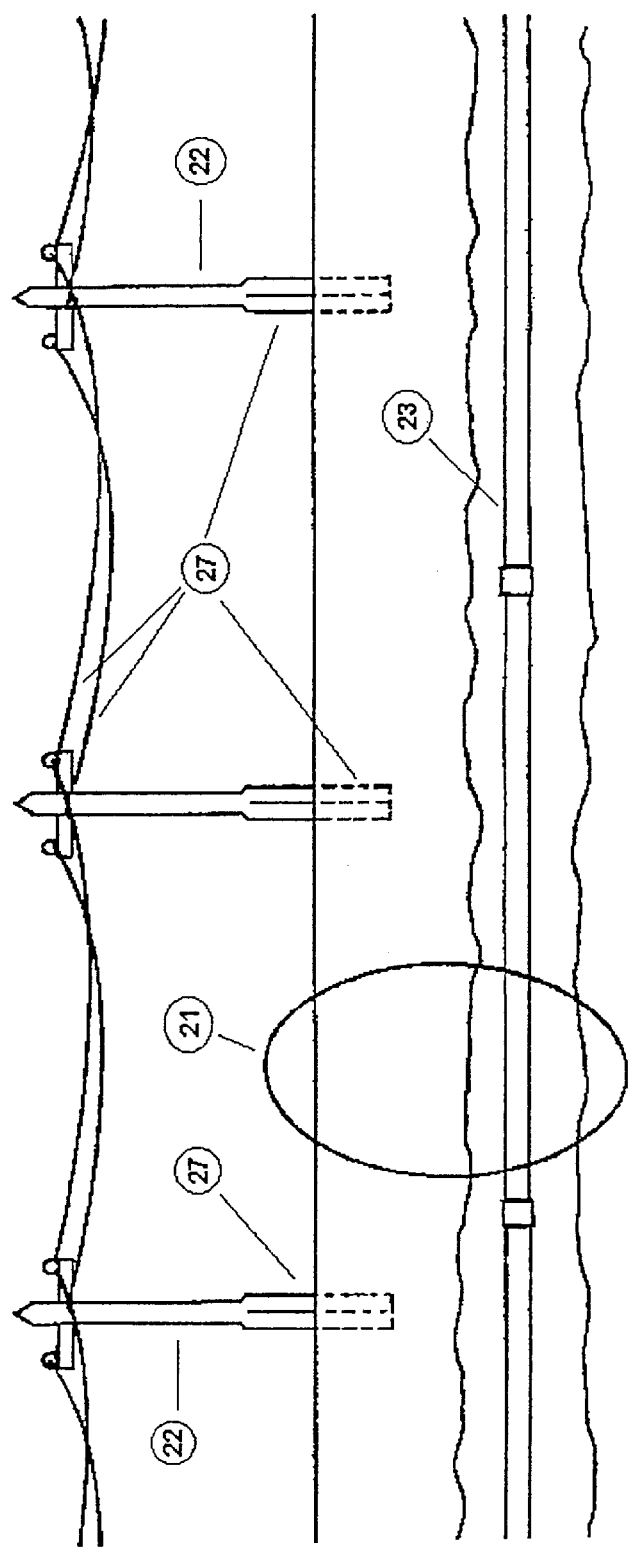
FIG. 2 is a schematic illustrating a gas line right-of-way with placement of batteries within transmission poles retrofitted onto the existing right-of-way.

As shown in FIG. 2, within a gas line right-of-way 21 a buried gas pipeline 23 is installed. The instant invention envisions placement of composite non-conductive electricity transmission poles, (such as the Shakespeare pole), connected to a standard electricity transmission line 27. Within or adjacent to the base of the poles 22 storage batteries 27 are installed in accordance with the instant invention.

Figure 3:
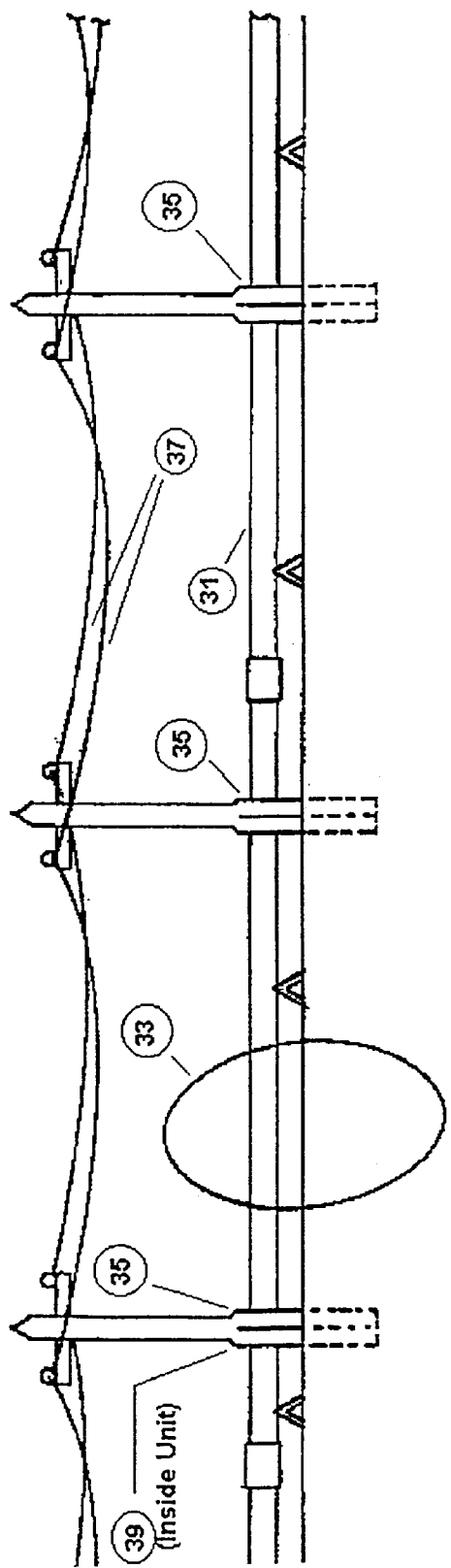
FIG. 3 is a schematic illustrating an oil pipeline right-of-way with placement of batteries within transmission poles.

As shown in FIG. 3, an aboveground oil pipeline 31 is permitted and in place along the existing right-of-way 33. The instant invention envisions retrofit of existing right-of-way, for example, in the case of aboveground oil pipeline, placement of batteries 35 underground within the rights-of-way and connected to transmission line 37. The batteries are controlled by electronic mechanism 39 and typically store electrical energy during non-peak load hours with discharge of Electricity into the transmission grid during peak load hours. The discharge of energy is envisioned to be metered, for example, at the point of connection of the transmission line 37 to the grid.

Figure 4:
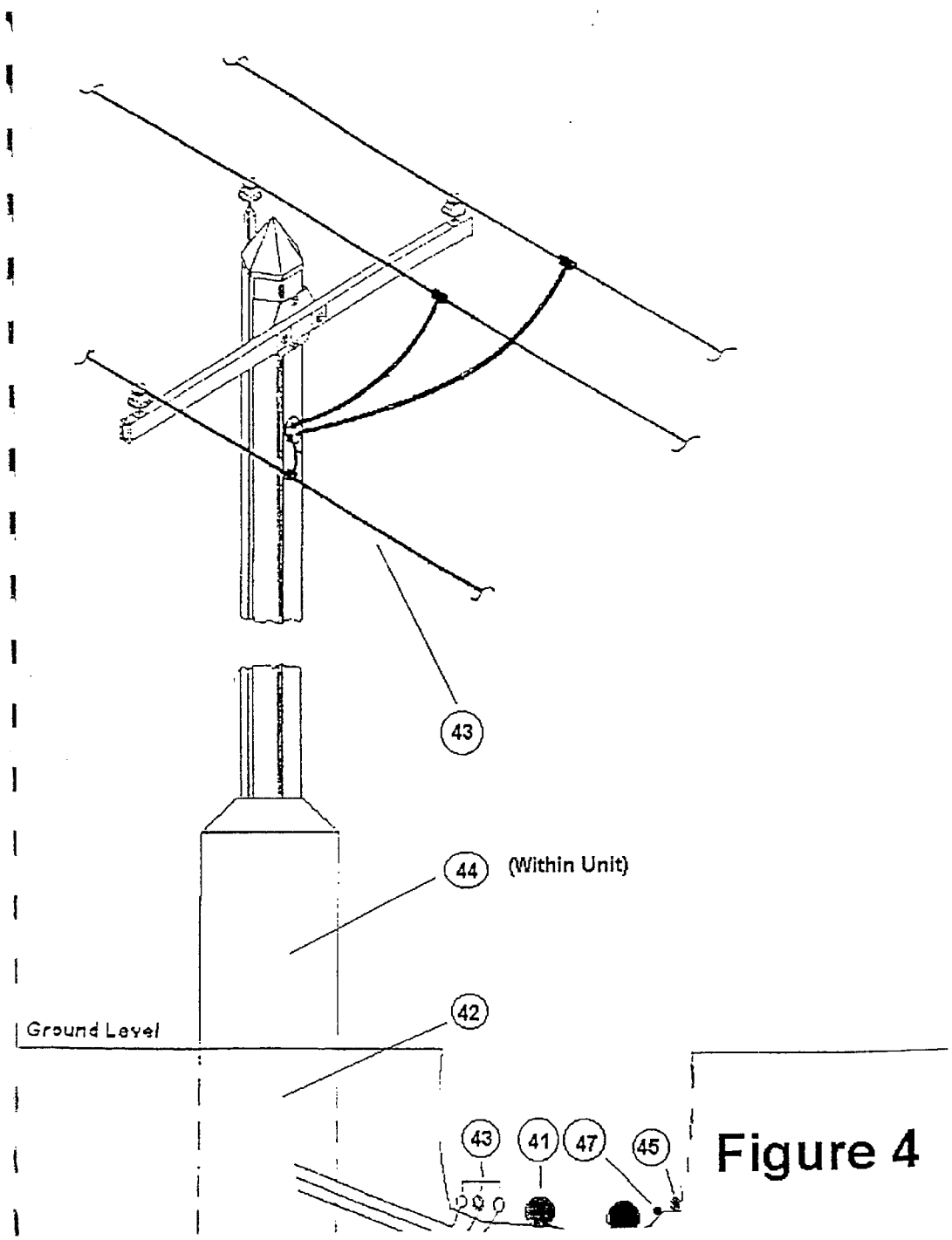
FIG. 4 is a schematic illustrating a multi-use right-of-way with placement of batteries within transmission poles.

As shown in FIG. 4, an existing right-of-way which has, for example, a right-of-way), contains multiple-use configuration, such as: water line 41, power line 43, telephone line 45, television-type/communication cable 47, and the like. The instant invention envisions placement of storage batteries 42 underground within the right-of-way and connected to the power line 43 and controlled by electronic battery storage control mechanism 44 such that the batteries typically store electrical energy during non-peak load hours with discharge of electricity into the transmission grid during peak load hours.

Figure 5:
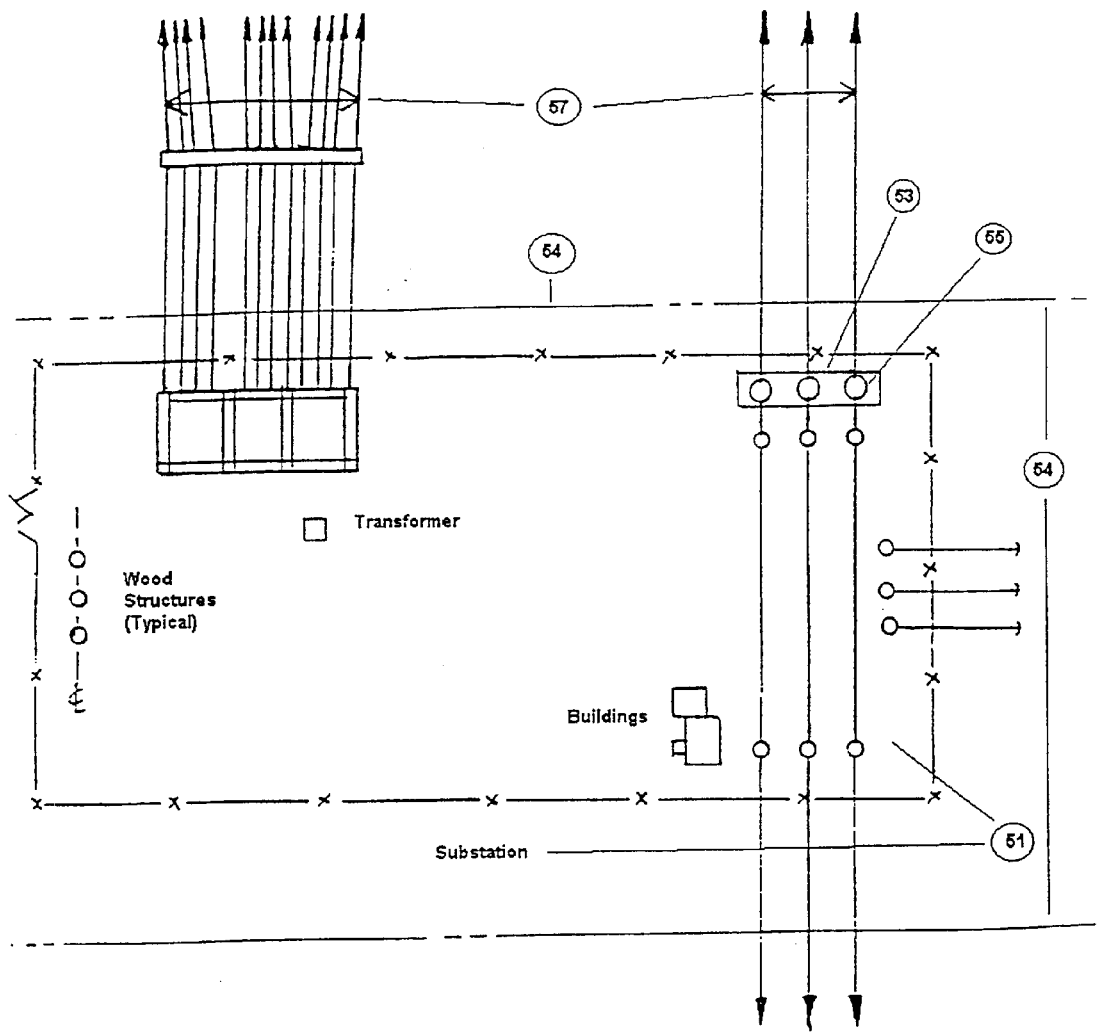
FIG. 5 is an electricity switchyard/substation illustrating placement of batteries.

In FIG. 5, a substation 51 exists on permitted right-of-way. The instant invention envisions placement of storage batteries 53 at the perimeter 54 of the permitted substation right-of-way. This placement optimizes use of the right-of-way while minimizing interference of battery storage capability within the electromagnetic field of the yard. The batteries 53 are connected to control mechanisms 55 and transmission lines 57 as demonstrated.

Figure 6:
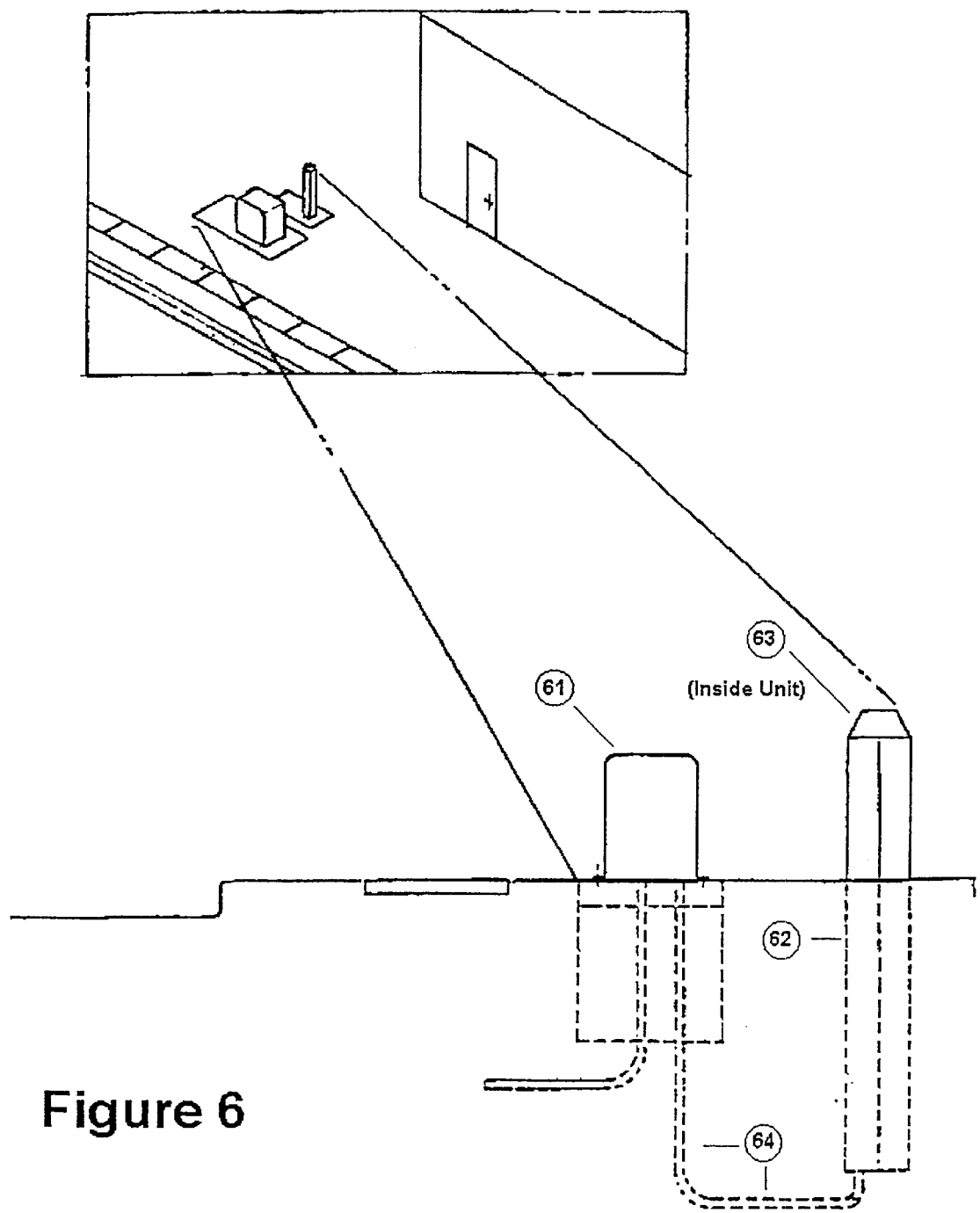
FIG. 6 is a transformer right-of-way illustrating placement of batteries within transmission poles.

In FIG. 6, a transformer 61 is located on a standard, concrete transformer pad alongside the roadway and adjacent to a building 62 (see insert) served with electricity by the transformer. The instant invention envisions placement partially underground of battery storage 62 connected to electronic control mechanism 63 and connected to the transformer by conductor 64. This placement allows the battery to serve a dual function of storage/discharge of energy in a non-peak/peak load manner as described above as well as to serve the function of eliminating voltage irregularities often found in electricity delivered directly from the transmission grid. The instant invention envisions therefore, the delivery of "premium power" to those customers for whom such "clean" electricity is important because of the customer's business such as manufacturing of electronic parts, etc. Therefore, the instant invention envisions the placement of such batteries on existing transformer platforms and serving such customers.

Figure 7A:
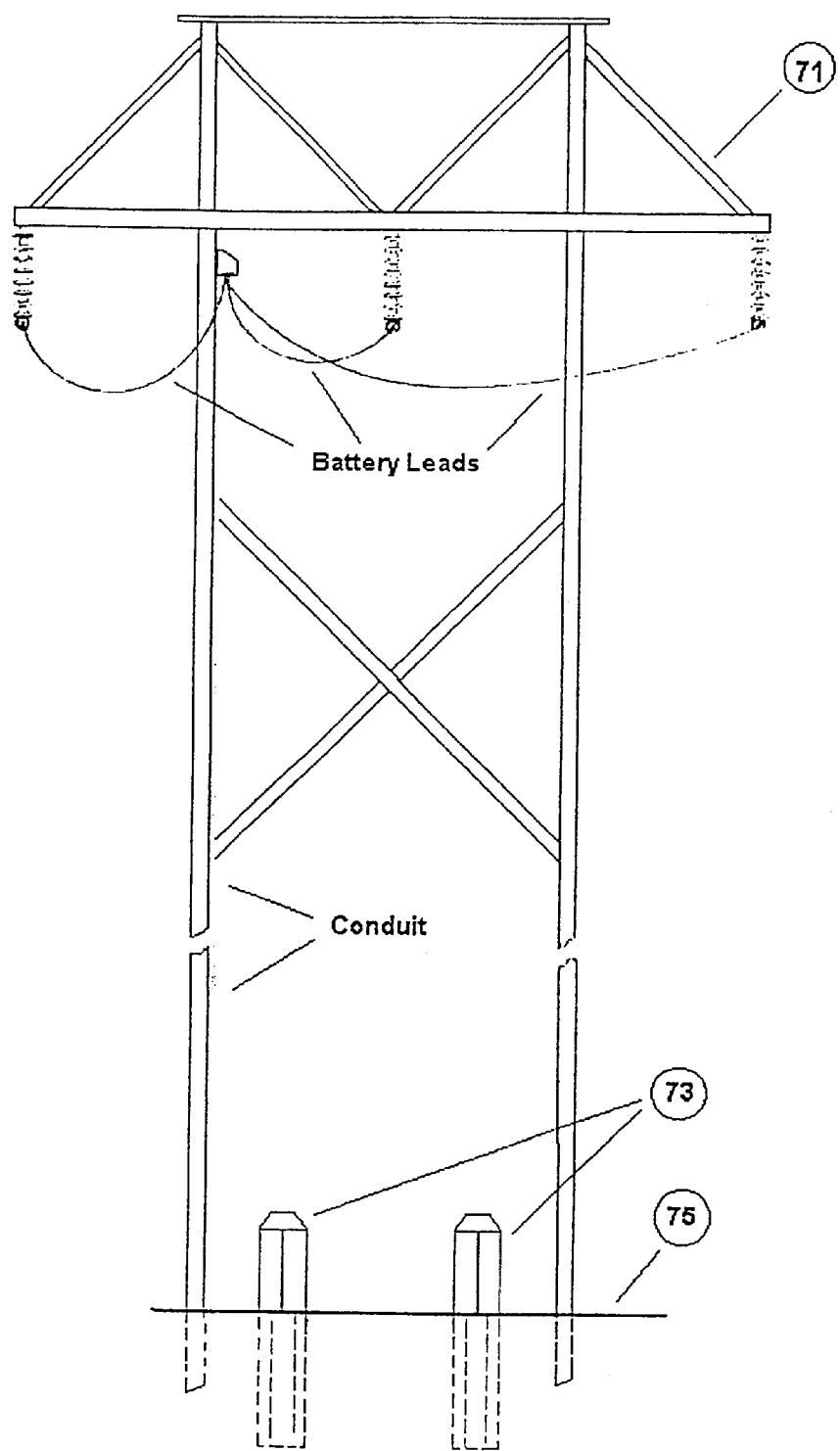
FIGS. 7a & 7b are schematic illustrations of an H-structure transmission tower with placement of batteries on transformer platform.
Figure 7B:
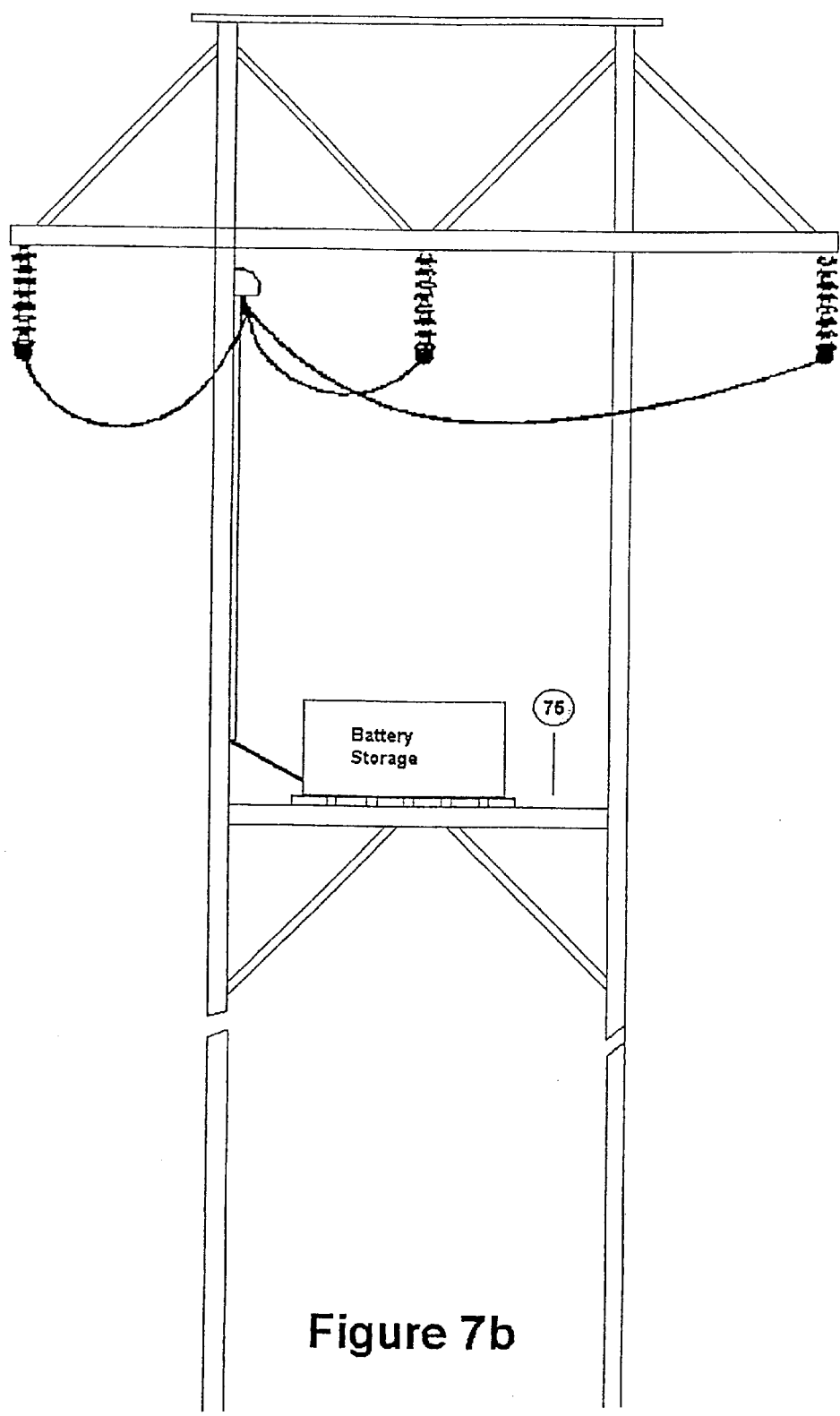

As shown in FIGS. 7a and 7b, the standard H-structure transmission tower 71 has placement of storage batteries 73 on a transformer-type platform 75. The instant invention envisions the replacement of existing transformers on platforms through the placement of the batteries and control mechanisms of the instant invention. This configuration serves a dual purpose in that the electrical energy can be stored and discharged as described above and also can be rendered LE clean"—meaning that the irregularities in the voltage levels "peaks and valleys" often seen in electricity delivered from the grid are eliminated. The instant invention envisions therefore, the delivery of "premium power" to those customers for whom such "clean" electricity is important because of the customer's business such as manufacturing of electronic parts, etc. Therefore, tile instant invention envisions the placement of such batteries on existing transformer platforms and serving such customers.

Figure 8:
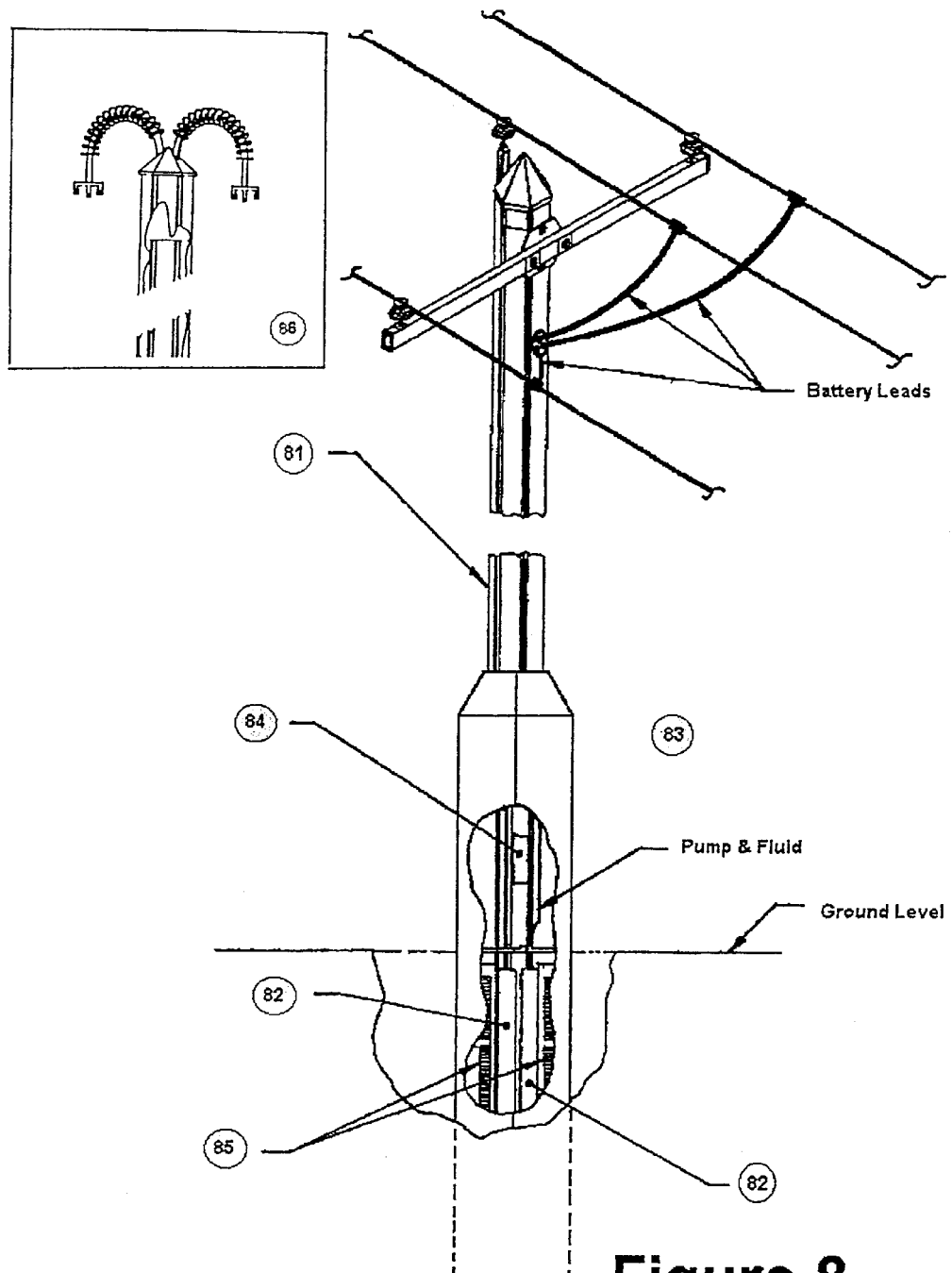
FIG. 8 is a schematic illustration of the detail of placement of storage batteries within the composite pole described in U.S. Pat. No. 5,175,971, the entire contents of which are incorporated herein by this reference.

As shown in FIG. 8, the composite grooved pole described in U.S. Pat. No. 5,175,971, the entire contents of which are incorporated herein by this reference, is illustrated with details of battery and control mechanism placement. The area within the base of the central composite monopoly structure SI houses the electrolyte fluids 82. The exterior base composite sleeve foundation 83 houses the dielectric cells 85 within the underground level location and tile control, monitoring and communications electronics 84 in the area directly above the battery component.

Figure 9:
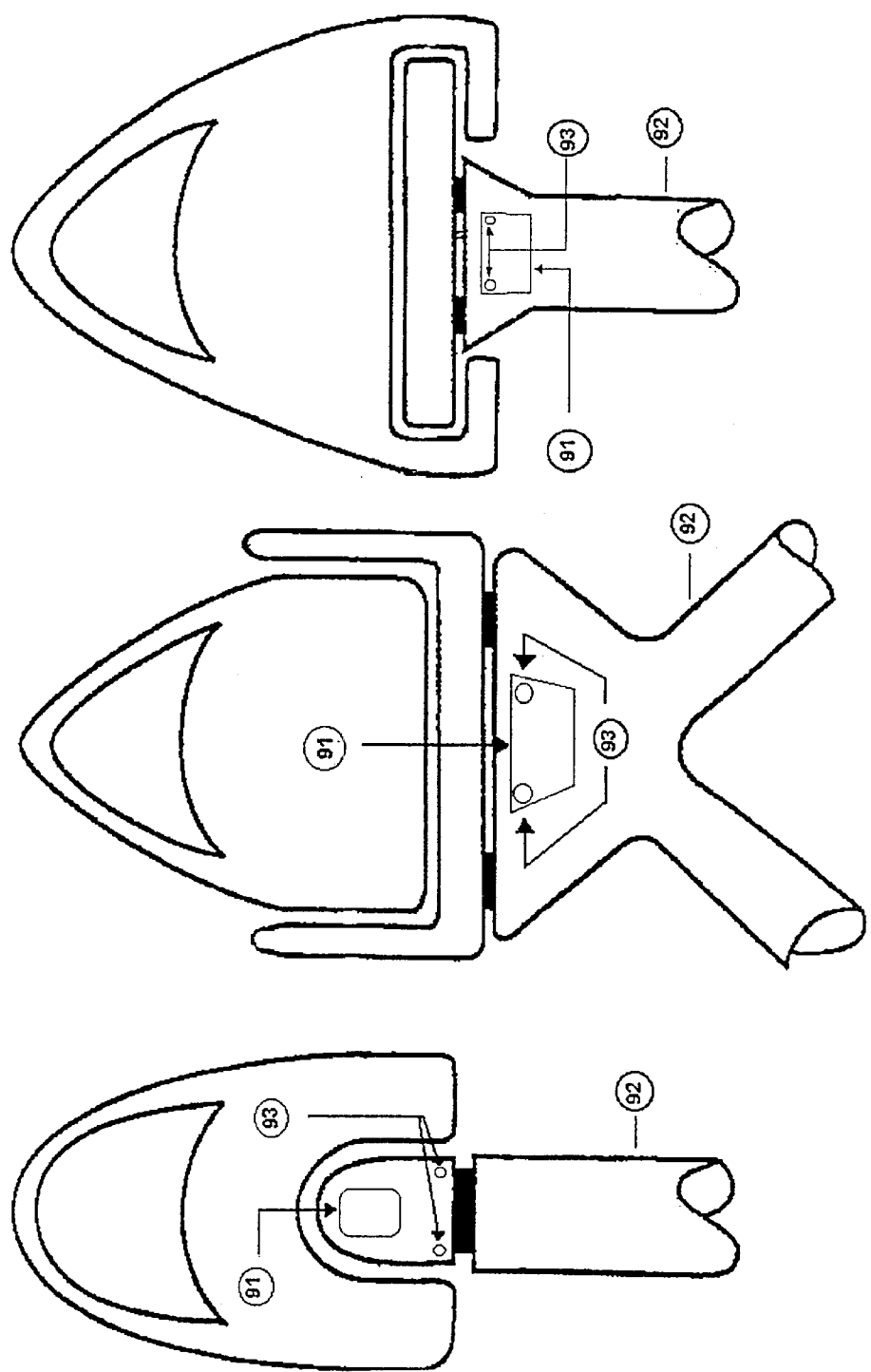
FIG. 9 is a schematic illustration of various magnetically levitated high-speed transportation system support configurations with the battery storage system imbedded into the guide beam, support system, or foundation.

In FIG. 9, the battery storage system 91 is placed within the guide beam, support structure, or foundation 92 and connected to the supply conductors 93. The guide beams, supports and the foundation can be of standard construction or alternatively, made out of a non-conductive concrete with composite reinforcing rebars. It is also envisioned that other embodiments are possible wherein the transmission line and/or the storage can be located in various other locations within the rail right-of-way in order to maximize efficiency or safety, etc., and to provide the best performance of the system, both for train and the associated functions. For example, other locations are envisioned within the guide beam, the support structure and foundation. Alternatively, the composite pole illustrated herein in preceding illustrations can be placed in the same right-of-way and along side the train support. In this configuration, the power transmission line, communications line and wireless antennae and battery storage can be associated with the line of poles and serve both the needs of the train, train passengers and surrounding community.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for improving the performance of an electrical power distribution grid, said grid utilizing existing rights of way to traverse real property, comprising the steps of
   a. providing a plurality of electrical storage devices capable of alternately storing and discharging electricity,
   b. locating the electrical storage devices within the existing rights of way, and
   c. connecting said storage devices to said grid.

2. The method of claim 1 further comprising the step of locating at least some of said electrical storage devices within new rights of way granted to expand said grid.

3. The method of claim 1 wherein said existing rights of way are selected from the group consisting of gas line rights-of-way, power line rights-of-way, substation rights-of-way, petroleum rights-of-way, communications rights-of-way, road rights-of-way, water rights-of-way, sewer rights-of-way, railroad rights-of-way, and combinations thereof.

4. The method of claim 1 wherein said electrical storage devices are placed within the rights of way for electric transmission poles utilized in said grid.

5. The method of claim 4 wherein said electrical storage devices are placed within said electrical transmission poles.

* * * * *